United States Patent
Jo et al.

(10) Patent No.: US 9,867,091 B2
(45) Date of Patent: Jan. 9, 2018

(54) APPARATUS AND METHOD FOR SEARCHING TARGET CELL FOR HANDOVER IN WIRELESS COMMUNICATION SYSTEM

(71) Applicant: Samsung Electronics Co., Ltd., Gyeonggi-do (KR)

(72) Inventors: Ohyun Jo, Seoul (KR); Eun-Young Seo, Gyeonggi-do (KR); Seok-Yong Lee, Seoul (KR); Sang-Hyun Chang, Seoul (KR)

(73) Assignee: Samsung Electronics Co., Ltd (KR)

( * ) Notice: Subject to any disclaimer, the term of this patent is extended or adjusted under 35 U.S.C. 154(b) by 188 days.

(21) Appl. No.: 14/540,680

(22) Filed: Nov. 13, 2014

(65) Prior Publication Data
US 2015/0131616 A1    May 14, 2015

(30) Foreign Application Priority Data
Nov. 13, 2013  (KR) .................... 10-2013-0137755

(51) Int. Cl.
*H04W 36/00* (2009.01)
*H04W 16/28* (2009.01)
*H04W 64/00* (2009.01)

(52) U.S. Cl.
CPC ....... *H04W 36/0083* (2013.01); *H04W 16/28* (2013.01); *H04W 36/0061* (2013.01); *H04W 64/006* (2013.01)

(58) Field of Classification Search
CPC ........................ H04W 36/0094; H04W 36/08
USPC ....................................................... 370/331
See application file for complete search history.

(56) References Cited

U.S. PATENT DOCUMENTS

| | | | | |
|---|---|---|---|---|
| 6,359,901 B1* | 3/2002 | Todd | .................... | H04L 12/5695 370/465 |
| 7,072,692 B1* | 7/2006 | Katz | .................... | H04B 7/0608 455/442 |
| 7,639,984 B2* | 12/2009 | Uwano | ................ | H04B 7/0408 455/554.1 |
| 8,374,148 B2 | 2/2013 | Choi et al. | | |
| 2006/0223573 A1 | 10/2006 | Jalali | | |
| 2008/0032696 A1 | 2/2008 | Choi et al. | | |

(Continued)

FOREIGN PATENT DOCUMENTS

| | | |
|---|---|---|
| EP | 0 772 950 | 4/2002 |
| GB | 2 364 617 | 1/2002 |
| GB | 2 393 077 | 3/2004 |

(Continued)

OTHER PUBLICATIONS

Wei Li et al., "Joint Channel Parameter Estimation Using Evolutionary Algorithm", 2010 IEEE International Conference on Communications (ICC), May 23, 2010, 6 pages.

(Continued)

*Primary Examiner* — Wei Zhao
(74) *Attorney, Agent, or Firm* — The Farrell Law Firm, P.C.

(57) ABSTRACT

Disclosed is a method and apparatus for searching a target cell for handover in a wireless communication system. The method includes determining a priority of at least one neighboring base station based on the reliability of a direction of a beam allocated to a mobile station, and transmitting a message informing the mobile station of the priority.

20 Claims, 13 Drawing Sheets

(56) References Cited

U.S. PATENT DOCUMENTS

2010/0069070 A1    3/2010  Shi et al.
2016/0219475 A1*   7/2016  Kim .................... H04W 76/025

FOREIGN PATENT DOCUMENTS

WO    WO 99/33304      7/1999
WO    WO 2012/142876   10/2012

OTHER PUBLICATIONS

European Search Report dated Mar. 23, 2016 issued in counterpart application No. 14193024.8-1854, 12 pages.
European Search Report dated Apr. 2, 2015 issued in counterpart application No. 14193024.8-1854.
Camillo Gentile et al: "Ranging and Localization in Harsch Multipath Environments, Multipath and NLOS Mitigation Algorithms", XP055339634, In: "Geolocation Techniques: Principles and Applications", Jan. 31, 2013, 82 pages.
European Search Report dated Feb. 3, 2017 issued in counterpart application No. 14193024.8-1854, 15 pages.
European Search Report dated Jul. 27, 2017 issued in counterpart application No. 14193024.8-1854, 13 pages.

* cited by examiner

APPARATUS AND METHOD FOR SEARCHING TARGET CELL FOR HANDOVER IN WIRELESS COMMUNICATION SYSTEM

PRIORITY

The present application claims priority under 35 U.S.C. §119(a) to a Korean patent application filed in the Korean Intellectual Property Office on Nov. 13, 2013, and assigned Serial No. 10-2013-0137755, the contents of which are incorporated herein by reference.

BACKGROUND OF THE INVENTION

1. Field of the Invention

The present invention relates generally to handover in a wireless communication system.

2. Description of the Related Art

In a wireless communication system, a user in motion sometimes needs to change a current base station or Access Point (AP) for seamless service. The base station or AP change is generally defined as handover or handoff.

To change the serving base station through the handover, it is first necessary to identify base stations, or perform a target cell search. In this process, a mobile station conducts scanning to search for an available base station so that the mobile station can participate in the network. Basically, in a wireless Local Area Network (LAN) system, the mobile station scans every available channel, which is one of main causes of handover delay. As such, there is a need in the art for a method of decreasing the delay time in the handover process.

SUMMARY OF THE INVENTION

The present invention has been made to address at least the above problems and/or disadvantages and to provide at least the advantages described below. Accordingly, an aspect of the present invention is to provide an apparatus and a method for performing an efficient handover in a wireless communication system.

Another aspect of the present invention is to provide an apparatus and a method for decreasing time delay of a handover in a wireless communication system.

Another aspect of the present invention is to provide an apparatus and a method for searching a target cell in a wireless communication system.

Another aspect of the present invention is to provide an apparatus and a method for reducing a time required to search a target cell in a wireless communication system.

Another aspect of the present invention is to provide an apparatus and a method for prioritizing neighboring cells in a wireless communication system.

Another aspect of the present invention is to provide an apparatus and a method that determines a search priority of neighboring cells based on a beam direction allocated to a mobile station in a wireless communication system.

Another aspect of the present invention is to provide an apparatus and a method for processing a handover using a particular resource allocated in a wireless communication system.

According to an aspect of the present invention, a method for operating a base station in a wireless communication system includes determining a priority of at least one neighboring base station based on reliability of a direction of a beam allocated to a mobile station, and transmitting a message informing the mobile station of the priority.

According to another aspect of the present invention, a method for operating a mobile station in a wireless communication system includes receiving, from a base station, a message informing a priority of at least one neighboring base station, and searching to determine a target base station, the at least one neighboring base station according to the priority, wherein the priority is determined based on reliability of a direction of a beam allocated to the mobile station.

According to another aspect of the present invention, an apparatus of a base station in a wireless communication system includes a controller that determines a priority of at least one neighboring base station based on reliability of a direction of a beam allocated to a mobile station; and a communication part that transmits a message informing the mobile station of the priority.

According to still another aspect of the present invention, an apparatus of a mobile station in a wireless communication system includes a communication part that receives a message informing a priority of at least one neighboring base station, from a base station; and a controller for, to determine a target base station, searching the at least one neighboring base station according to the priority, wherein the priority is determined based on reliability of a direction of a beam allocated to the mobile station.

BRIEF DESCRIPTION OF THE DRAWINGS

The above and other aspects, features, and advantages of certain embodiments of the present invention will be more apparent from the following description taken in conjunction with the accompanying drawings, in which.

Throughout the drawings, like reference numerals will be understood to refer to like parts, components and structures.

DETAILED DESCRIPTION OF EMBODIMENTS OF THE INVENTION

Figure 1:
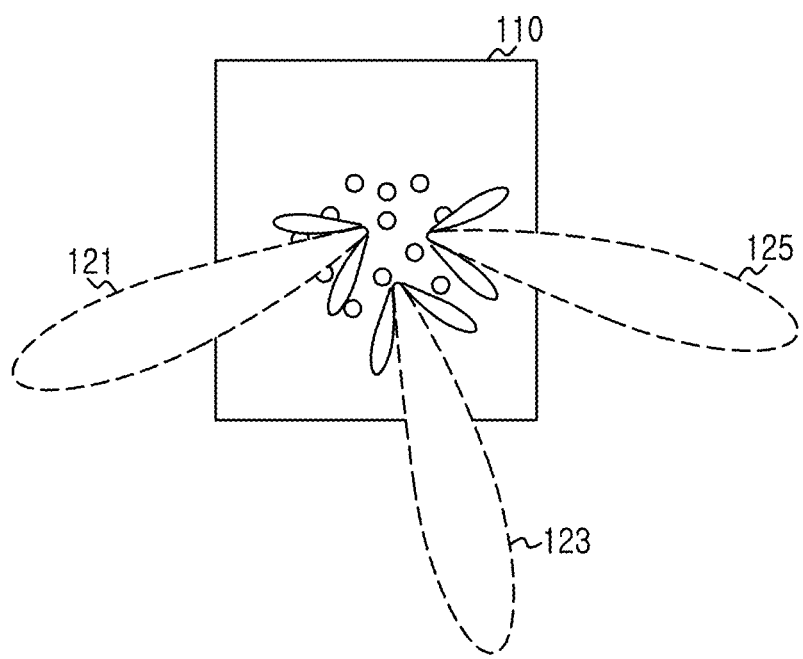
FIG. 1 illustrates signal directivity of beamforming in a wireless communication system according to an embodiment of the present invention.

The following description with reference to the accompanying drawings is provided to assist in a comprehensive understanding of embodiments of the invention as defined by the claims and their equivalents. Those of ordinary skill in the art will recognize that various changes and modifications of the embodiments described herein can be made without departing from the scope and spirit of the invention. Descriptions of well-known functions and constructions may be omitted for the sake of clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of embodiments of the present invention is provided for illustration purposes only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Embodiments of the present invention provide a technique for searching a target cell for handover in a wireless communication system.

The present invention is not limited to the terms used and uses other terms of the same technical meanings. For example, the term 'base station' embraces not only a base station of a cellular system but also an AP of a wireless LAN to another Embodiments of the present invention consider a beamforming communication environment. The beamforming increases a signal gain by giving directivity, and can be applied to a transmit signal or a received signal.

Transmit (Tx) beamforming applied to the transmit signal typically concentrates signals transmitted from antennas into a particular direction using a plurality of antennas. The set of the antennas can be referred to as an array antenna, and each antenna of the array antenna can be referred to as an antenna element. The Tx beamforming can extend a signal propagation distance and greatly mitigate interference affected on other users by transmitting minimal signal in other directions than the corresponding direction.

A receiver can also apply Receive (Rx) beamforming to the received signal using an Rx array antenna. The Rx beamforming increases a receive signal level incoming in the corresponding direction by concentrating the signal reception in a particular direction, and blocks an interference signal by excluding signals received in other directions than the corresponding direction.

FIG. 1 illustrates signal directivity of the beamforming in a wireless communication system according to an embodiment of the present invention. Referring to FIG. 1, an antenna module 110 performs the beamforming and includes an array antenna including a plurality of antennas or antenna elements. The antenna module 110 forms a plurality of directional beams 121, 123, and 125 by properly controlling a phase and a level of signals radiated from the antennas or the antenna elements.

When applying the beamforming, a base station estimates a relative location of a mobile station using the beam direction used to beamform the signal transmitted to the mobile station.

Figure 2:
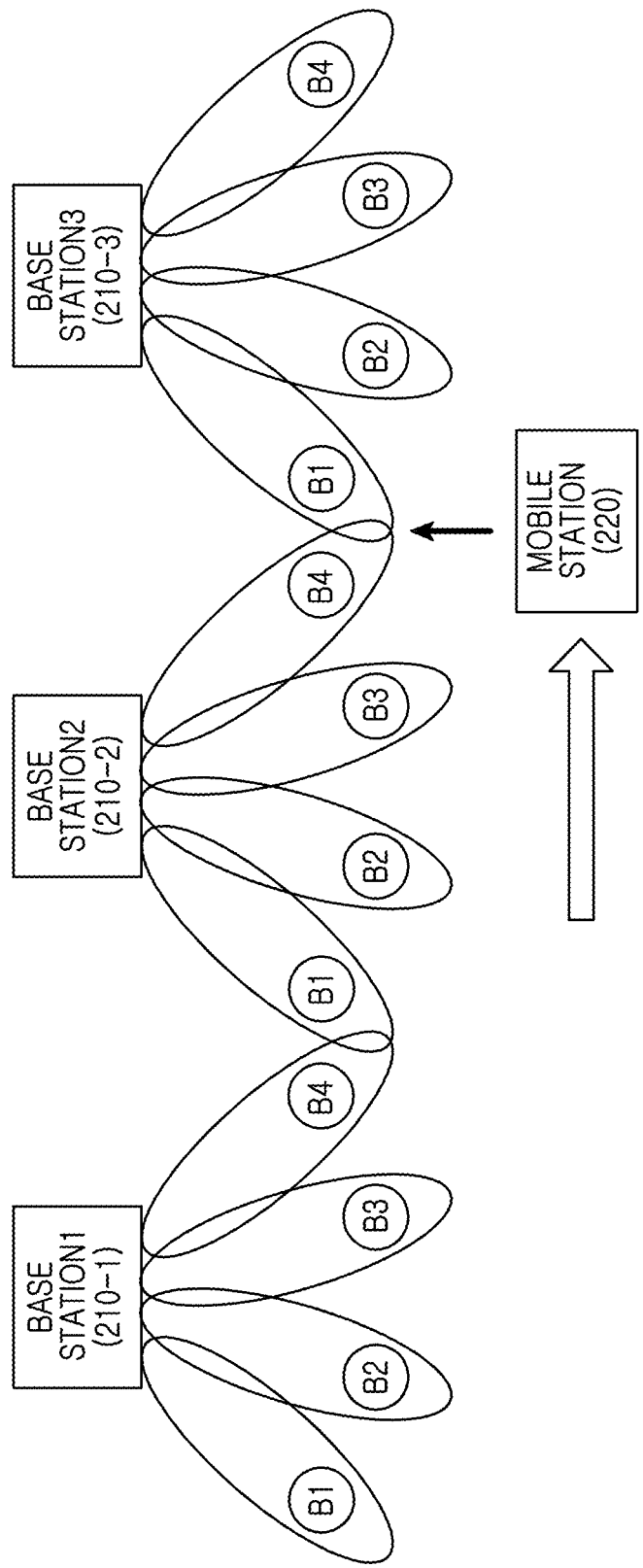
FIG. 2 illustrates beam directions according to a location of a mobile station in the wireless communication system according to an embodiment of the present invention.

FIG. 2 illustrates beam directions according to a location of a mobile station in the wireless communication system according to an embodiment of the present invention. Referring to FIG. 2, each of a first base station 210-1, a second base station 210-2, and a third base station 210-3 supports four beams B1 through B4. A mobile station 220 travels near the second base station 210-2 and the third base station 210-3. Since the mobile station 220 is in the direction of beam B4 of the second base station 210-2, the second base station 210-2 can beamform a signal transmitted to the mobile station 220 with beam B4. The beam used for the beamforming can be determined by a beam training procedure. The second base station 210-2 estimates that the mobile station 220 is in the direction of beam B4, based on the information that the signal transmitted to the mobile station 220 is beamformed with beam B4.

When the mobile station 220 leaves a cell of the second base station 210-2, it can hand over to another base station. In so doing, the second base station 210-2 estimates the relative location of the mobile station 220 based on the beam direction allocated to the mobile station 220, and determines another neighboring base station near the estimated location. In FIG. 2, since beam B4 is allocated to the mobile station 220, the second base station 210-2 estimates that the mobile station 220 is in the direction of beam B4. Hence, the second base station 210-2 determines that the third base station 210-3 in the direction similar to the direction of beam B4 is close to the current location of the mobile station 220, and suggests that the mobile station 220 first search the third base station 210-3 as the target cell.

As such, the relative location of the mobile station is estimated based on the allocated beam direction. Yet, it is not concluded that the beam direction always matches the direction of the mobile station, because the beam can be reflected by a wall or other object and then arrive at the mobile station. Hence, the base station determines whether the beam direction can be regarded as the direction of the mobile station using the signal received from the mobile station.

The base station determines reliability of the beam direction using Channel Impulse Response (CIR). The CIR indicates, provided that the channel is one circuit, an output signal of an impulse input signal. By use of the CIR, delay spread, a channel gain, a Line Of Sight (LOS) component, and a Non-LOS (NLOS) component of the channel between the base station and the mobile station can be analyzed.

The base station measures the CIR using a predefined signal received from the mobile station. For example, the base station uses a preamble at a front end of a packet, a sounding signal for estimating an uplink channel, a midamble, and a pilot signal. Alternatively, the base station uses a separate signal defined for the CIR measurement.

Figure 3A:
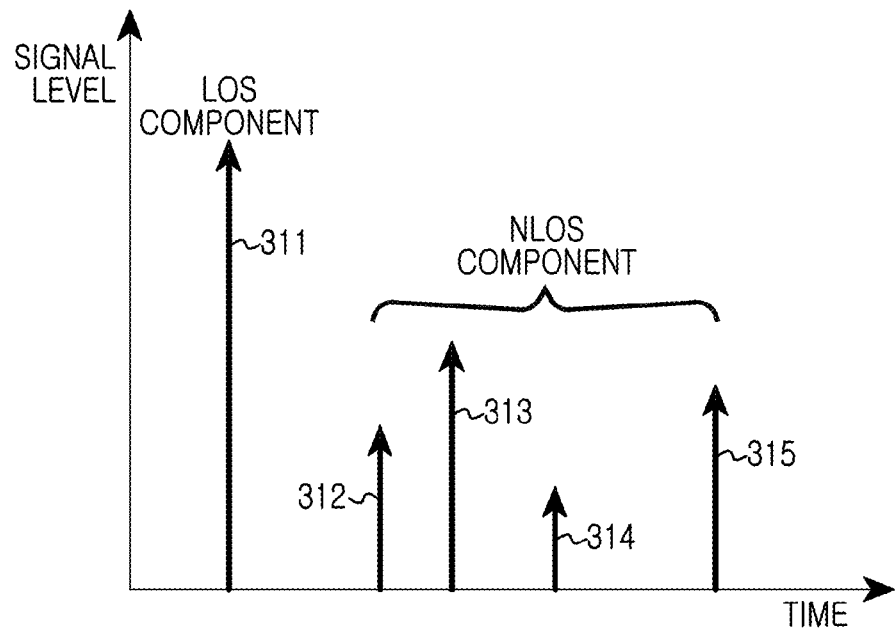
FIGS. 3A and 3B illustrate Channel Impulse Response (CIR) in the wireless communication system according to an embodiment of the present invention.
Figure 3B:
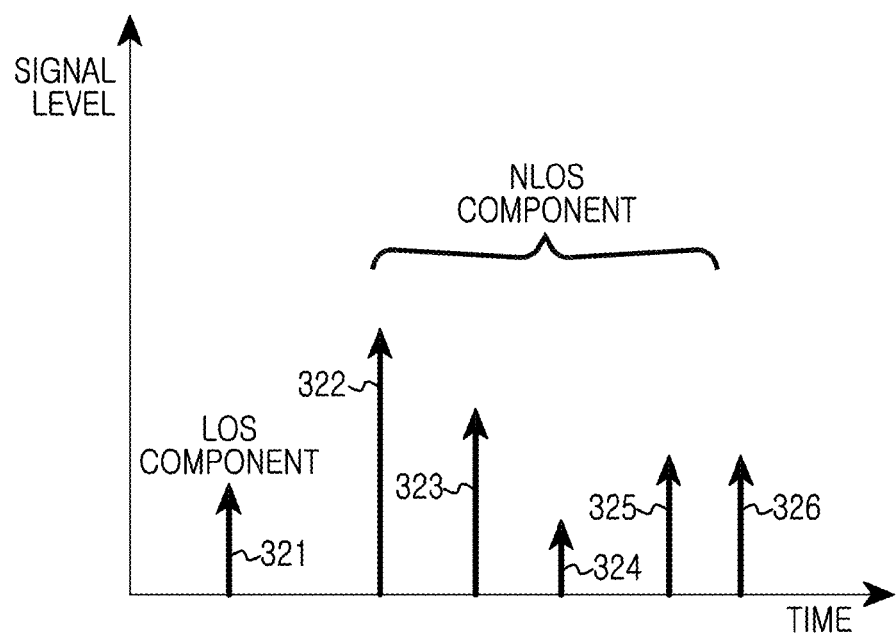

FIGS. 3A and 3B illustrate the CIR in the wireless communication system according to an embodiment of the present invention. Specifically, FIGS. 3A and 3B illustrate a reception time and a signal level of the signal based on time. Since the signal radiated in a radio channel is received through a multi-path, a plurality of components is received from the signal transmit signal at different times. Since the LOS path is the shortest, the LOS component is received first.

Referring to FIG. 3A, five signal components 311 through 315 are present. The LOS component 311 received first is relatively stronger than the other NLOS components 312 through 315. In other words, the LOS component 311 is dominant. When a difference between the LOS component 311 and the strongest NLOS component 313 of the NLOS components 312 through 315 exceeds a threshold, the secured LOS path can be determined. Thus, when the first component is the strongest according to the CIR measurement and the difference between the first component and the strongest component of the remaining components exceeds the threshold, the base station determines that the LOS path is secured.

Referring to FIG. 3B, six signal components 321 through 326 are present. The LOS component 321 received first is relatively weaker than the other NLOS components 322 through 326. That is, the CIR of FIG. 3B implies that the signal is not successfully transmitted in the LOS path. For example, when the beam received in a detour due to an object between the transmitter and the receiver exhibits optimal performance, the CIR of FIG. 3B can be measured. Hence, when the first component is not the strongest according to the CIR measurement, the base station determines that the LOS path is not secured. Alternatively, when the first component is the strongest according to the CIR measurement but the difference between the first component and the strongest one of the other components falls below the threshold, the base station determines that the LOS path is not secured.

As such, the base station measures the CIR using the signal received from the mobile station and determines, based on the CIR measurement, whether the channel is the LOS path. When the base station and the mobile station communicate in the LOS path, it is highly likely that the beam direction matches the direction of the mobile station. In contrast, when the base station and the mobile station do not communicate in the LOS path, that is, when the NLOS component is the main component received, it is highly likely that the beam direction is different from the direction of the mobile station. That is, when the LOS path is not determined, it is difficult to conclude that the beam direction matches the direction of the mobile station. Further, it is highly likely that the mobile station travels in a different direction from the beam direction.

The base station determines a search priority of the neighboring base stations based on the determined direction of the mobile station. First, the base station measures the CIR of the channel of the mobile station, and determines whether the channel is the LOS environment based on the CIR measurement. That is, the base station determines whether the beam allocated to the mobile station is transmitted in the LOS path.

Upon determining the LOS environment, the base station can rely on the beam direction. Hence, the base station determines the mobile station in the beam direction and relatively increases the priority of the neighboring base station close to the beam direction. Thus, the mobile station first searches for the neighboring base station prior to the other base stations. In contrast, when the LOS environment is not determined, the base station relatively lowers the priority of the neighboring base station close to the beam direction. Thus, the mobile station first searches the other base station prior to the neighboring base station.

To control the search order of the mobile station according to the priority, the base station provides the mobile station with neighboring base station information including the determined priority. The neighboring base station information including the priority can be transmitted as data traffic, or as a control message defined to carry the neighboring base station information. For example, when three neighboring base stations are present, the neighboring base station information includes items of identification information, a Media Access Control (MAC) address, channel information, and the priority as shown in Table 1.

TABLE 1

| Identification information | MAC address | Channel information | Priority |
|---|---|---|---|
| AP1 | 00-00-00-00-00-00-00 | 1 | 5 |
| AP2 | 00-00-00-00-00-00-01 | 3 | 3 |
| AP3 | 00-00-00-00-00-00-02 | 4 | 3 |

In Table 1, the identification information identifies the neighboring base station, the MAC address indicates a physical address of the corresponding neighboring base station, the channel indicates a value of a frequency band used by the corresponding neighboring base for the communication, and the priority indicates the search priority.

Figure 4:
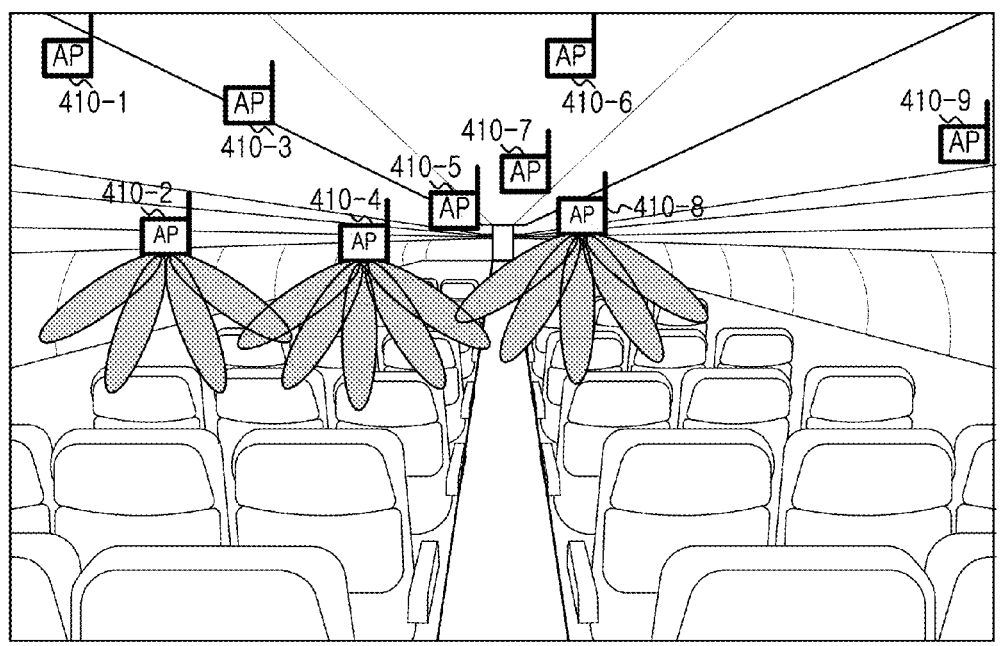
FIG. 4 illustrates the wireless communication system according to an embodiment of the present invention.

FIG. 4 illustrates the wireless communication system according to an embodiment of the present invention. Specifically, FIG. 4 illustrates a wireless LAN system.

Referring to FIG. 4, a plurality of APs 410-1 through 410-9 configures an In-Flight Entertainment (IFE) system in an airplane. Since the APs 410-1 through 410-9 are installed by the same network provider, they can obtain adjacent AP information, such as identification information and location. An enterprise network in an office can be configured in a manner similar to FIG. 4.

Figure 5:
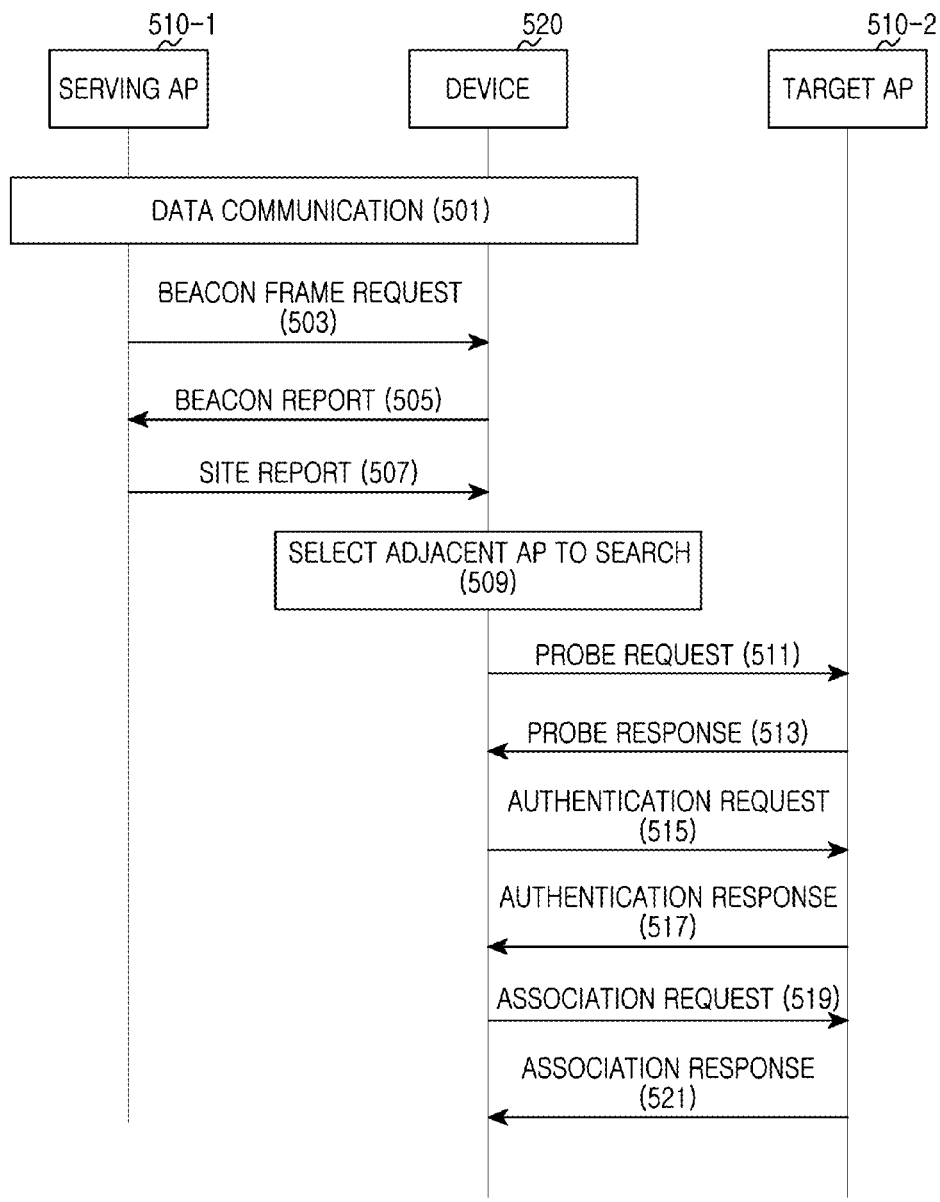
FIG. 5 illustrates signal exchange for handover in the wireless communication system according to an embodiment of the present invention.

FIG. 5 illustrates signal exchange for the handover in the wireless communication system according to an embodiment of the present invention. Specifically, FIG. 5 illustrates the signal exchange for the handover in the wireless LAN system of FIG. 4.

Referring to FIG. 5, a device 520 and a serving AP 510-1 transmit and receive data in step 501. The serving AP 510-1 allocates at least one beam in a beam training procedure with the device 520 and beamforms a signal transmitted to the device 520 using the allocated beam.

In step 503, the serving AP 510-1 transmits a beacon frame request to the device 520. That is, the serving AP 510-1 requests to report a channel condition through the beacon frame request, which can be transmitted on a periodic basis or according to a predefined event.

In step 505, the device 520 transmits a beacon report. That is, the device 520 reports the current channel condition to the serving AP 510-1 through the beacon report. The serving AP 510-1 determines based on the beacon report whether to perform the handover. The beacon report includes a Received Channel Power Indicator (RCPI). In FIG. 5, the serving AP 510-1 determines to perform the handover.

In step 507, the serving AP 510-1 transmits a site report to the device 520. That is, the serving AP 510-1 provides at least one adjacent AP information to be searched by the device 520 through the site report. In so doing, the serving AP 510-1 determines the priority of the at least one adjacent AP based on the beam allocated to the device 520, that is, the beam direction used to beamform the signal transmitted to the device 520 and whether the communication channel with the device 520 is the LOS path. The base station includes the priority to the adjacent AP information of the site report.

In step 509, the device 520 determines the adjacent AP to search. In so doing, the device 520 determines the adjacent AP to search based on the priority received through the site report. That is, the device 520 tunes a Radio Frequency (RF) module to a channel of the adjacent AP of the highest priority and performs the following operations. In FIG. 5, a target AP 510-2 is selected as the AP to search.

In step 511, the device 520 transmits a probe request to the target AP 510-2. In step 513, the target AP 510-2 transmits a probe response to the device 520. The probe request and the probe response are transmitted and received as part of the search procedure, and the handover is determined based on the channel quality measured by the probe request and the probe response. The probe response includes a Service Set Identifier (SSID) of the target AP 510-2, identification information of the target AP 510-2, security setting, and channel information. When the channel quality measured by the probe request and the probe response does not satisfy a handover condition, the device 520 attempts to search the adjacent AP of the next priority. In FIG. 5, the channel quality of the target AP 510-2 satisfies the handover condition.

In step 515, the device 520 transmits an authentication request to the target AP 510-2. In step 517, the target AP 510-2 transmits an authentication response to the device 520. That is, the device 520 and the target AP 510-2 conduct the authentication procedure. The authentication procedure determines whether the device 520 is authorized to access the target AP 510-2. Details of the authentication procedure vary according to the security setting of the target AP 510-2. For example, the security setting includes one of open authentication and shared key authentication. In the shared key authentication, the device 520 transmits a key value through the authentication request, and the target AP 510-2 transmits a response about whether the key value matches a correct key, that is, whether the access is granted through the authentication response. In the open authentication, the device 520 requests to determine whether the key value is required through the authentication request, and the target AP 510-2 confirms that the key value is not required through the authentication response.

In step 519, the device 520 transmits an association request to the target AP 510-2. In step 521, the target AP 510-2 transmits an association response to the device 520. That is, the device 520 and the target AP 510-2 perform the association procedure, which establishes the connection between the device 520 and the target AP 510-2. Through the association procedure, the target AP 510-2 determines whether the association is permitted. When the association is permitted, the target AP 510-2 allocates an Association Identifier (AID) to the device 520 and transmits the AID using the association response. In contrast, when the association is rejected, the target AP 510-2 transmits a failure reason code through the association response.

Figure 6:
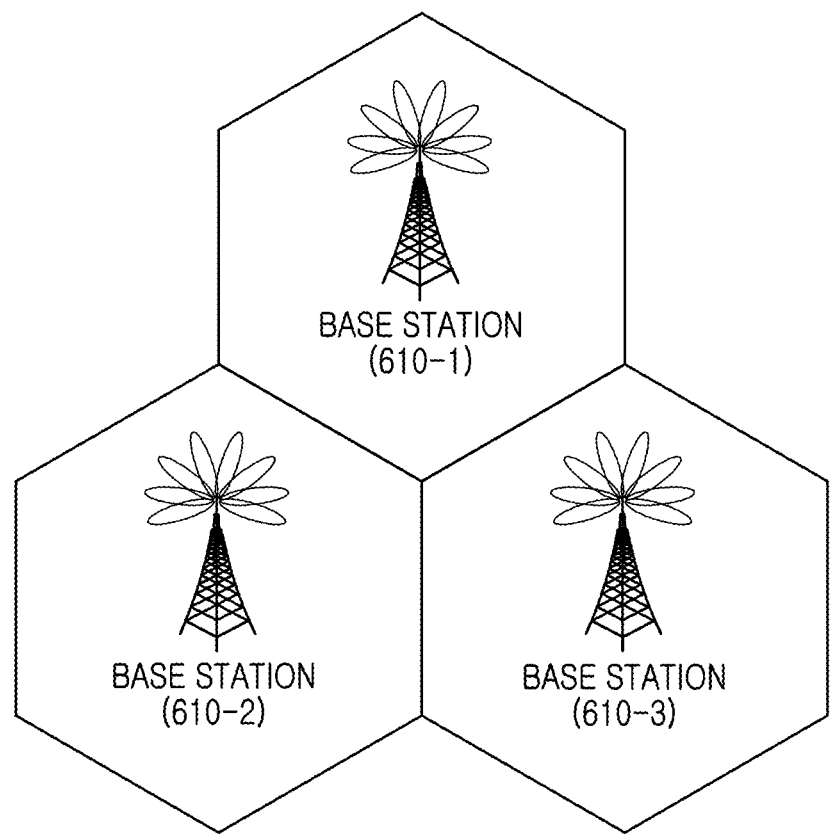
FIG. 6 illustrates a wireless communication system according to an embodiment of the present invention.

FIG. 6 illustrates a wireless communication system according to an embodiment of the present invention. Specifically, FIG. 6 illustrates a cellular system.

Referring to FIG. 6, a plurality of base stations 610-1 through 610-3 is installed close to each other. The base stations 610-1 through 610-3 perform the beamforming for the signal transmission. For example, the base stations 610-1 through 610-3 use a frequency of a millimeter (mm) wave band as the carrier. The base stations 610-1 through 610-3, which are installed by the same network provider, can obtain neighboring base station information, such as identification information and location.

Figure 7:
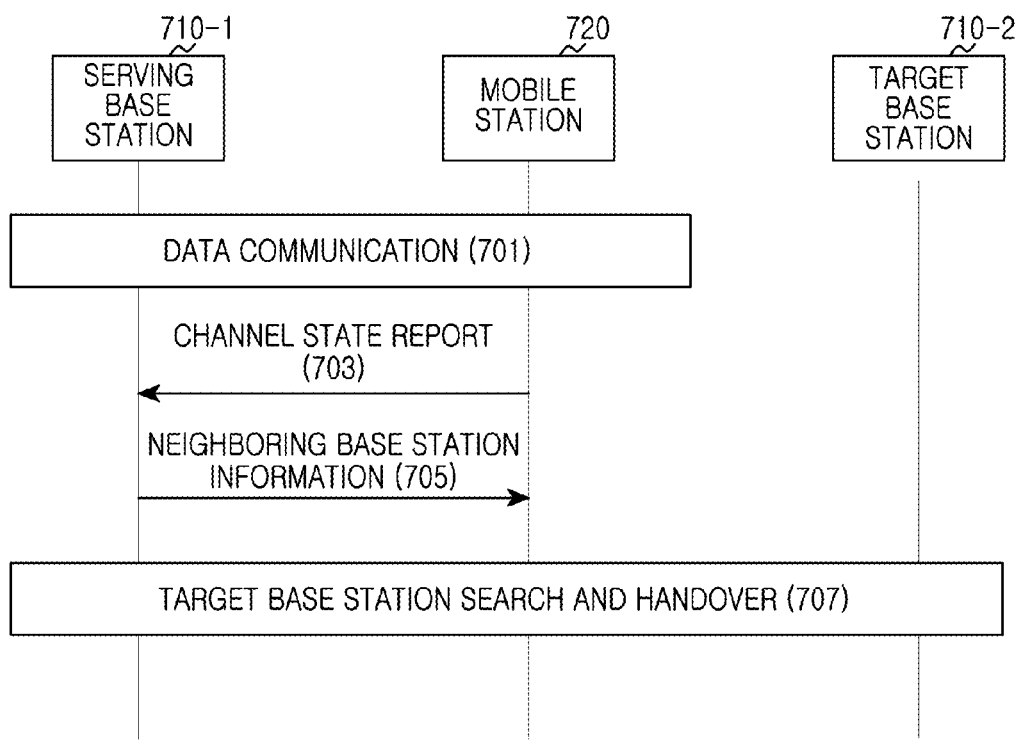
FIG. 7 illustrates signal exchange for the handover in the wireless communication system according to an embodiment of the present invention.

FIG. 7 illustrates signal exchange for the handover in the wireless communication system according to an embodiment of the present invention. Specifically, FIG. 7 illustrates the signal exchange for the handover in the cellular system of FIG. 6.

Referring to FIG. 7, a mobile station 720 and a serving base station 710-1 transmit and receive data in step 701. The serving base station 710-1 allocates at least one beam in a beam setting procedure with the mobile station 720 and beamforms a signal transmitted to the mobile station 720 using the allocated beam. For example, the beam setting procedure is performed by transmitting and receiving signals with every available pair of the transmit beams of the serving base station 710-1 and the receive beams of the mobile station 720.

In step 703, the mobile station 720 transmits a channel state report to the serving base station 710-1. The channel state report can be referred to as a Measurement Report (MR). For example, the channel state report includes the channel quality of the serving base station 710-1, and can further include the channel quality of at least one neighboring base station. For example, the channel state report can inform at least one of an event determined based on the channel quality of the serving base station 710-1 and an event determined based on the channel quality of the serving base station 710-1 and the at least one neighboring base station. In FIG. 7, the serving base station 710-1 determines the handover of the mobile station 720 based on the channel state report.

In step 705, the serving base station 710-1 transmits neighboring base station information to the mobile station 720. The serving base station 710-1 determines the priority of the at least one neighboring base station based on the beam allocated to the mobile station 720, that is, the beam direction used to beamform the signal transmitted to the mobile station 720 and whether the communication channel with the mobile station 720 is the LOS path. The base station includes the priority to the neighboring base station information. In FIG. 7, the serving base station 710-1 determines the handover and then transmits the neighboring base station information. Alternatively, the neighboring base station information can be transmitted on a periodic basis regardless of the handover.

In step 707, the mobile station 720 determines the neighboring base station to search and performs the handover procedure with the determined neighboring base station. In so doing, the mobile station determines the neighboring base station to search based on the priority received through the site report. In FIG. 7, the target base station 710-2 is selected as the base station to search.

As such, the base station can provide the mobile station to hand over with the priority of the neighboring base stations determined based on the beam direction. In addition to the priority of the neighboring base stations, the base station can control the mobile station to set the transmit beam in advance based on the beam direction.

Since the direction of the mobile station is estimated using the beam direction allocated to the mobile station, the base station can also estimate a relative location of the mobile station and the neighboring base station. Hence, the base station can inform the beam direction to be used by the mobile station to transmit the signal to the neighboring base station, or inform the mobile station of the relative or absolute location of the neighboring base station. Hence, before searching the neighboring base station, the mobile station can set the transmit beam for the neighboring base station.

In this case, the mobile station can beamform the signal (e.g., the probe request) transmitted for the cell search. Hence, the possibility that the neighboring base station successfully receives the signal from the mobile station is increased. As a result, the success probability of the search is increased and the handover delay time is further reduced.

Figure 8:
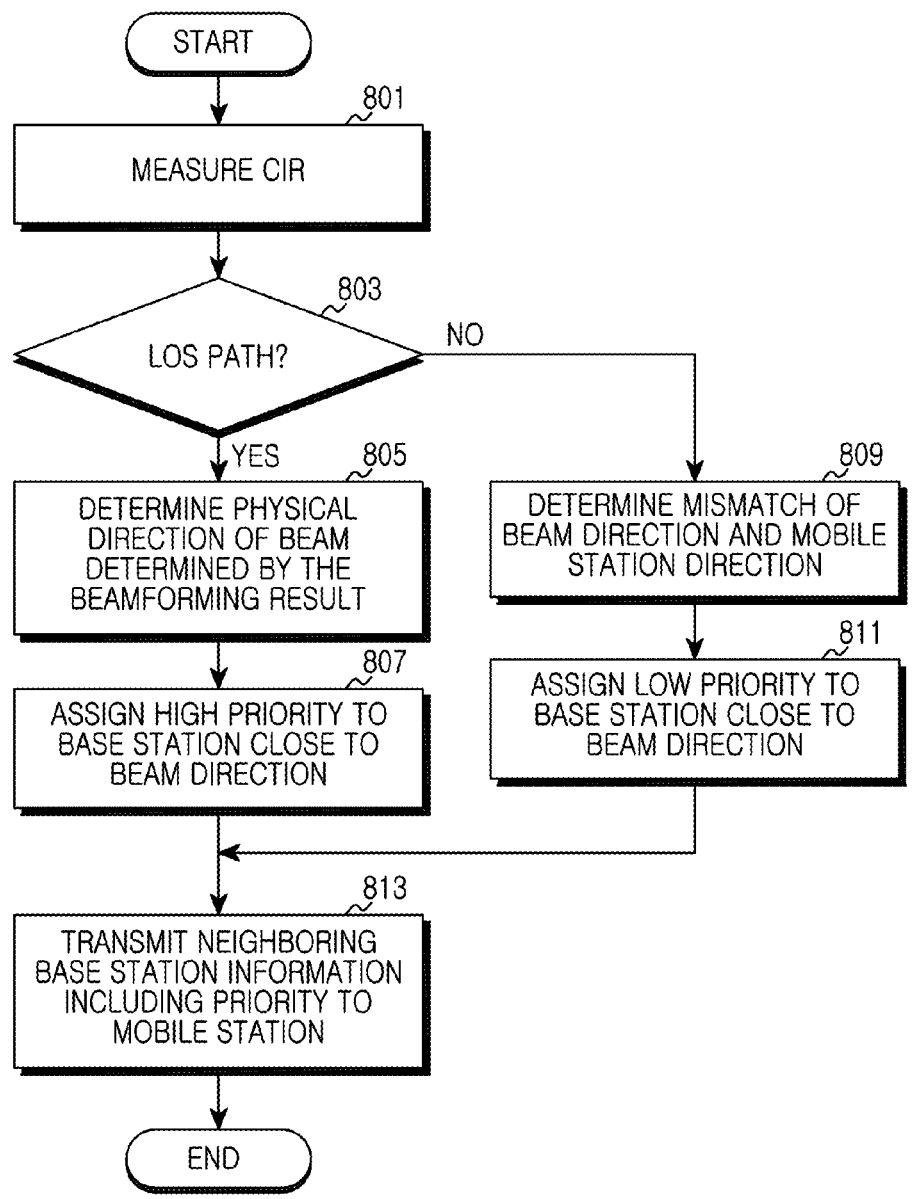
FIG. 8 illustrates operations of a base station in the wireless communication system according to an embodiment of the present invention.

FIG. 8 illustrates operations of the base station in the wireless communication system according to an embodiment of the present invention.

Referring to FIG. 8, the base station measures the CIR of the channel of the mobile station in step 801. That is, the base station measures the CIR to determine the reliability of the beam direction, that is, to determine whether the beam direction allocated to the mobile station matches the direction of the mobile station. The CIR can be measured using the signal received from the mobile station. Herein, the base station measures the CIR after determining that the handover of the mobile station is necessary, according to a predefined condition regardless of the handover, or on a periodic basis.

In step 803, the base station determines whether the communication channel of the mobile station is the LOS path. The base station determines the LOS path by comparing the LOS component and the NLOS component of the CIR. For example, the base station determines that the communication channel is the LOS path when the first component of the CIR is the strongest and the difference between the first component and the strongest one of the other components exceeds the threshold.

Upon determining the LOS path, the base station determines the physical direction of the beam determined by the beamforming result in step 805. The base station beamforms the signal transmitted to the mobile station and identifies the beam direction allocated to the mobile station. The beam direction is determined through the beam training procedure when the mobile station accesses, and can be changed while the mobile station is connected to the base station. Herein, since the beam direction is used to determine the other neighboring base station close to the direction of the mobile station, the base station determines the handover of the mobile station and then identifies the beam direction.

In step 807, the base station gives high priority to the neighboring base station close to the beam direction. In the LOS environment, it is highly likely that the beam direction allocated to the mobile station matches the direction of the mobile station. Accordingly, the base station gives a higher priority to the neighboring base station close to the beam direction, than the other neighboring base stations. That is, the base station substitutes the physical direction of the beam determined by the beamforming result, to the direction of the mobile station. In so doing, the base station determines the neighboring base station for the high priority based on the angle between the beam direction and the direction of the neighboring base stations. In other words, the base station can give the high priority to the neighboring base station located within a threshold range with respect to the beam direction. Further, the base station determines the neighboring base station for the high priority by considering not only the angle but also a distance to the neighboring base stations and a distance to the mobile station. The distance to the mobile station is estimated based on the channel quality of the mobile station. The base station determines the neighboring base station for the high priority by further considering a beam allocation history of the mobile station. When the beam allocation history indicates that the beams allocated to the mobile station changes with a certain directivity, the direction of the mobile station is estimated more accurately. For example, when the beam allocated to the mobile station shifts B2→B3→B3 as shown in FIG. 2, a higher priority is assigned to the third base station 210-3 and a lower priority is assigned to the first base station 210-1.

When the LOS path is not determined in step 803, the base station determines the mismatch of the beam direction and the mobile station direction in step 809. When the communication channel is not the LOS path, the signal beamformed with the beam allocated to the mobile station is reflected by a wall or other object and then reaches the destination, rather than directly arriving at the destination. Accordingly, it is highly likely that the beam direction is not the direction of the mobile station. Hence, the base station determines that the mobile station is located in another direction than the beam direction.

In step 811, the base station assigns a low priority to the neighboring base station close to the beam direction. Since it is not the LOS environment, it is highly likely that the beam direction allocated to the mobile station does not match the direction of the mobile station. Hence, the base station gives the lower priority to the neighboring base station close to the beam direction, than the other neighboring base stations. In so doing, the base station determines the neighboring base station for the low priority based on the angle between the beam direction and the direction of the neighboring base stations, the distance to the neighboring base stations, and the distance to the mobile station.

In step 813, the base station transmits the neighboring base station information including the priority to the mobile station. That is, when transmitting the neighboring base station information to the mobile station to hand over, the base station assigns the priority of the neighboring base station close to the beam direction allocated to the mobile station, according to the LOS path. The base station unicasts or broadcasts the neighboring base station information to the mobile station. The base station transmits the neighboring base station information after determining the handover, or on a periodic basis.

Figure 9:
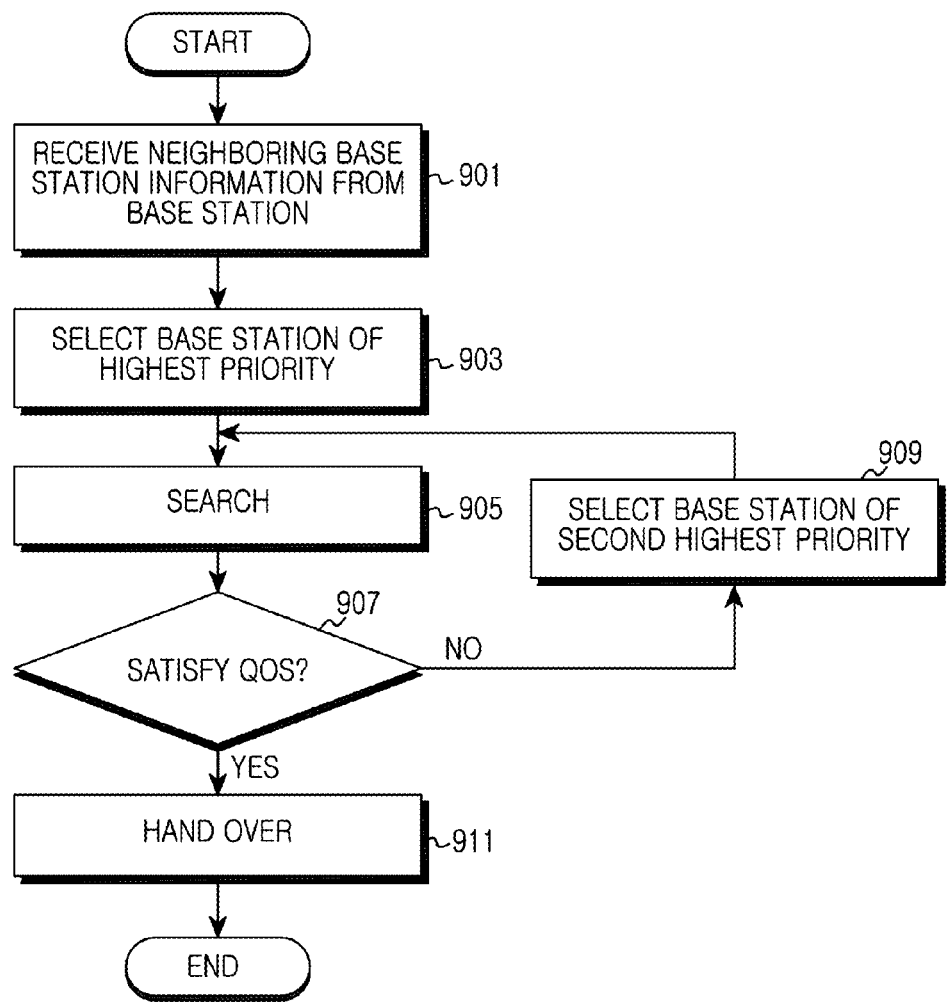
FIG. 9 illustrates operations of a mobile station in the wireless communication system according to an embodiment of the present invention.

FIG. 9 illustrates operations of the mobile station in the wireless communication system according to an embodiment of the present invention.

Referring to FIG. 9, the mobile station receives the neighboring base station information from the base station in step 901. The neighboring base station information includes the information, such as the base station identification information and channel information, for searching the neighboring base stations and the priority of the neighboring base stations. The neighboring base station information is unicast or broadcast to the mobile station. The neighboring base station information is received after determining the handover, or on a periodic basis.

In step 903, the mobile station selects the neighboring base station of the highest priority. The neighboring base station of the highest priority is determined by the serving base station which transmits the neighboring base station information. The neighboring base station of the highest priority is determined based on the beam direction allocated to the mobile station and whether the communication channel between the serving base station and the mobile station is the LOS path.

In step 905, the mobile station searches the selected neighboring base station. The mobile station tunes the RF module to the channel of the selected neighboring base station and transmits a search signal. For example, the mobile station transmits the probe request. Alternatively, the mobile station attempts to detect a sync signal transmitted from the selected neighboring base station.

In step 907, the mobile station determines whether a required Quality of Service (QoS) is satisfied. The required QoS is the necessary condition for the handover and includes the channel quality.

When the QoS is not satisfied, the mobile station selects the base station of the second highest priority in step 909. That is, the neighboring base station information includes the information of the neighboring base stations. When the neighboring base station information includes the information of only one base station or when there is no neighboring base station of the second highest priority, the mobile station terminates the handover and finishes this process. When selecting the neighboring base station of the second highest priority, the mobile station returns to step 905.

In contrast, when the QoS is satisfied, the mobile station performs the handover in step 911. That is, the mobile station determines the searched neighboring base station as the target base station and accesses the target base station. The mobile station performs a registration procedure to the target base station. For example, the mobile station transmits the authentication request and the association request. Alternatively, the mobile station reports the channel quality of the target base station to the serving base station and accesses the target base station.

Figure 10:
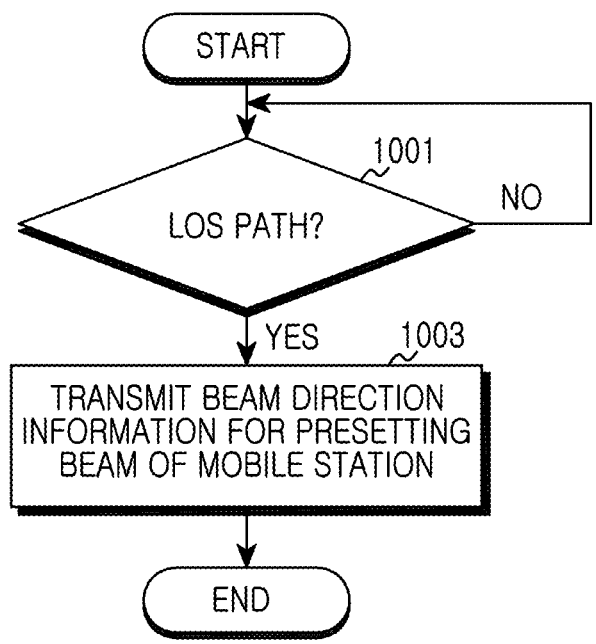
FIG. 10 illustrates operations of the base station in the wireless communication system according to another embodiment of the present invention.

FIG. 10 illustrates operations of the base station in the wireless communication system according to another embodiment of the present invention.

Referring to FIG. 10, the base station determines whether the communication channel of the mobile station to hand over is the LOS path in step 1001. The base station determines the LOS path by comparing the LOS component and the NLOS component of the CIR of the channel of the mobile station. For example, the base station determines that the communication channel is the LOS path when the first component of the CIR is the strongest and the difference between the first component and the strongest one of the other components exceeds the threshold.

Upon determining the LOS path, the base station transmits beam direction information for presetting the beam of the mobile station in step 1003. The beam direction information controls the mobile station to preset the transmit beam for the neighboring base station to search. For example, the beam direction information can indicate at least one of the beam direction to be used by the mobile station to transmit the signal to the neighboring base station, the absolute location of the neighboring base station, and the relative location of the neighboring base station based on the mobile station.

Figure 11:
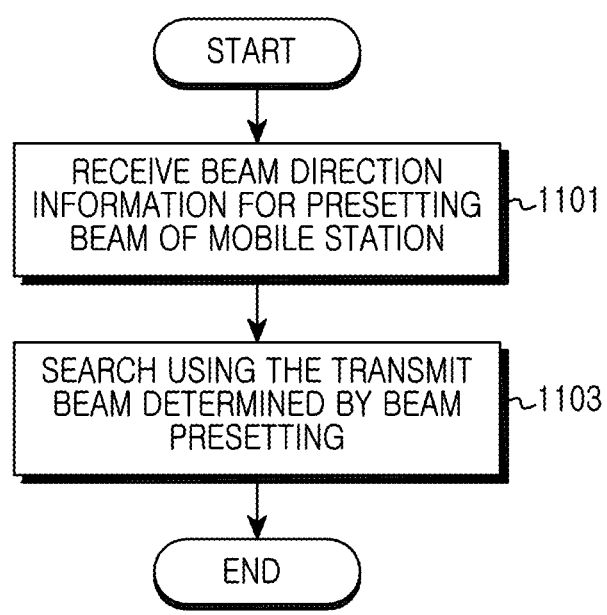
FIG. 11 illustrates operations of the mobile station in the wireless communication system according to another embodiment of the present invention.

FIG. 11 illustrates operations of the mobile station in the wireless communication system according to another embodiment of the present invention.

Referring to FIG. 11, the mobile station receives the beam direction information for presetting the beam in step 1101. The mobile station is to hand over and to search the neighboring base station. The beam direction information controls the mobile station to preset the transmit beam for the neighboring base station to search. For example, the beam direction information indicates at least one of the beam direction to be used by the mobile station to transmit the signal to the neighboring base station, the absolute location of the neighboring base station, and the relative location of the neighboring base station based on the mobile station.

In step 1103, the mobile station searches the neighboring base station using the transmit beam determined by the beam presetting. That is, before searching the neighboring base station, the mobile station determines the transmit beam for beamforming the signal to transmit to the neighboring base station based on the beam direction information. The mobile station beamforms the signal with the transmit beam. Hence, the mobile station can beamform the cell search signal (e.g., the probe request).

Figure 12:
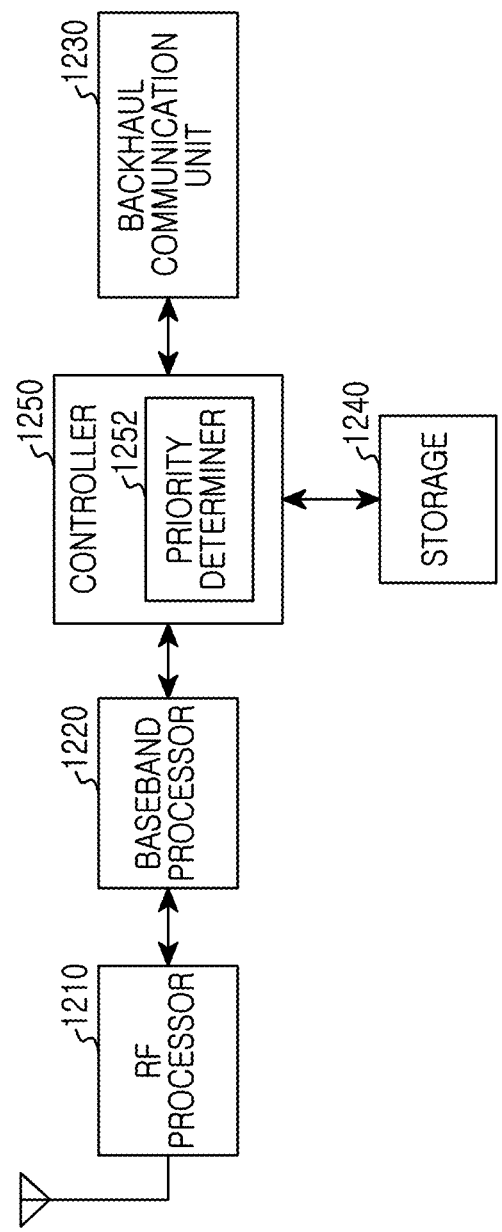
FIG. 12 illustrates the base station in the wireless communication system according to an embodiment of the present invention.

FIG. 12 is a block diagram of the base station in the wireless communication system according to an embodiment of the present invention.

Referring to FIG. 12, the base station includes an RF processor 1210, a baseband processor 1220, a backhaul communication unit 1230, a storage 1240, and a controller 1250.

The RF processor 1210 transmits and receives signals over a radio channel through signal band conversion and amplification. That is, the RF processor 1210 up-converts a baseband signal fed from the baseband processor 1220 to an RF signal, transmits the RF signal over the antenna, and down-converts an RF signal received over the antenna to the baseband signal. For example, the RF processor 1210 includes a transmit filter, a receive filter, an amplifier, a mixer, an oscillator, a Digital to Analog Converter (DAC) and an Analog to Digital Converter (ADC). While the single antenna is illustrated in FIG. 12, the base station can include a plurality of antennas. The RF processor 1210 includes a plurality of RF chains and performs the beamforming. For the beamforming, the RF processor 1210 regulates the phase and the magnitude of the signals transmitted and received via the antennas or the antenna elements.

The baseband processor 1220 converts the baseband signal and the bit stream according to a physical layer standard of the system. For example, for the data transmission, the baseband processor 1220 generates complex symbols by encoding and modulating the transmit bit stream. For the data reception, the baseband processor 1220 restores the received bit stream by demodulating and decoding the baseband signal fed from the RF processor 1210. As such, the baseband processor 1220 and the RF processor 1210 transmit and receive the signals. Hence, the baseband processor 1220 and the RF processor 1210 can be referred to as a transmitter, a receiver, a transceiver, a communication part, or a wireless communication part.

The backhaul communication unit 1230 provides an interface for communicating with other nodes in the network. That is, the backhaul communication unit 1230 converts the bit stream, to be sent from the base station to another node, for example, another base station or a core network, to the physical signal and converts the physical signal received from the other node to the bit stream. The storage 1240 stores a basic program for operating the base station, an application program, and data such as setting information. The storage 1240 provides the stored data according to a request of the controller 1250.

The controller 1250 controls the operations of the base station. For example, the controller 1250 transmits and receives the signals through the baseband processor 1220 and the RF processor 1210, or the backhaul communication unit 1230. The controller 1250 records and reads data to and from the storage 1240. The controller 1250 includes a priority determiner 1252 that determines the priority of the neighboring base stations of a particular mobile station. For example, the controller 1250 controls the base station to carry out the method of FIG. 8 or FIG. 10. The controller 1250 operates as follows.

The controller 1250 measures the CIR of the channel of the mobile station and determines, using the CIR, whether the communication channel of the mobile station is the LOS path. For the LOS path, the controller 1250 gives the high priority to the neighboring base station close to the physical direction of the beam allocated to the mobile station. In contrast, when it is not the LOS path, the controller 1250 gives the low priority to the neighboring base station close to the direction of the beam allocated to the mobile station. In so doing, the controller 1250 determines the neighboring base station for the high or low priority by considering the angle between the beam direction and the direction of the neighboring base stations, the distance to the neighboring base stations, the distance to the mobile station, and the beam allocation history of the mobile station. The controller 1250 then transmits the neighboring base station information including the priority to the mobile station through the baseband processor 1220 and the RF processor 1210. The controller 1250 can unicast or broadcast the neighboring base station information to the mobile station. The controller 1250 transmits the neighboring base station information after determining the handover, or on a periodic basis.

When the communication channel is the LOS path, the controller 1250 transmits the beam direction information for presetting the beam of the mobile station. The beam direction information controls the mobile station to preset the transmit beam for the neighboring base station to search. For example, the beam direction information notifies the beam direction to be used by the mobile station to transmit the signal to the neighboring base station, or the relative or absolute location of the neighboring base station in relation to the mobile station.

Figure 13:
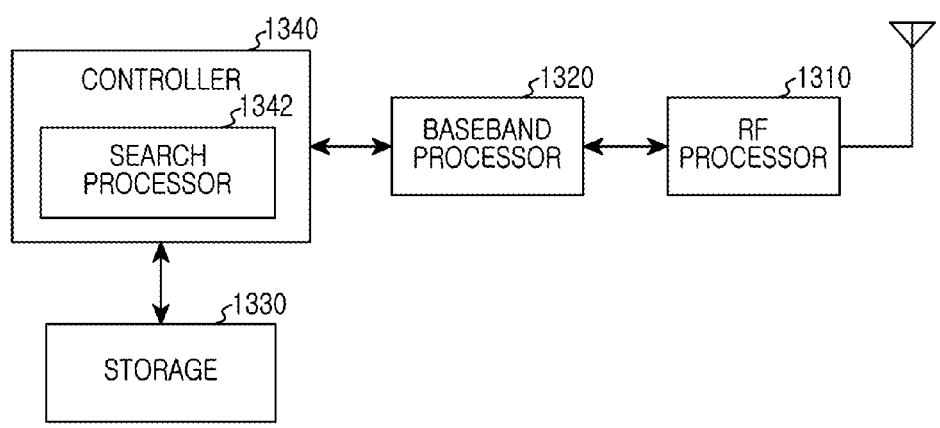
FIG. 13 illustrates the mobile station in the wireless communication system according to an embodiment of the present invention.

FIG. 13 is a block diagram of the mobile station in the wireless communication system according to an embodiment of the present invention.

As shown in FIG. 13, the mobile station includes an RF processor 1310, a baseband processor 1320, a storage 1330, and a controller 1340.

The RF processor 1310 transmits and receives signals over the radio channel through the signal band conversion and amplification. That is, the RF processor 1310 up-converts a baseband signal fed from the baseband processor 1320 to an RF signal, transmits the RF signal over the antenna, and down-converts an RF signal received over the antenna to a baseband signal. While the single antenna is illustrated in FIG. 13, the mobile station can include a plurality of antennas. The RF processor 1310 includes a plurality of RF chains and performs the beamforming. For the beamforming, the RF processor 1310 regulates the phase and the magnitude of the signals transmitted and received via the antennas or the antenna elements.

The baseband processor 1320 converts the baseband signal and the bit stream according to the physical layer standard of the system. For example, for the data transmission, the baseband processor 1320 generates complex symbols by encoding and modulating the transmit bit stream. For the data reception, the baseband processor 1320 restores the received bit stream by demodulating and decoding the baseband signal fed from the RF processor 1310. As such, the baseband processor 1320 and the RF processor 1310 transmit and receive the signals. Hence, the baseband processor 1320 and the RF processor 1310 can be referred to as a transmitter, a receiver, a transceiver, a communication part, or a wireless communication part.

The storage 1330 stores a basic program for operating the mobile station, an application program, and data such as setting information. The storage 1330 provides the stored data according to a request of the controller 1340.

The controller 1340 controls the operations of the mobile station. For example, the controller 1340 transmits and receives the signals through the baseband processor 1320 and the RF processor 1310. The controller 1340 includes a search processor 1342 for controlling to search the target base station prior to the handover. For example, the controller 1340 controls the mobile station to carry out the method of FIG. 9 or FIG. 11. The controller 1340 operates as follows.

The controller 1340 receives the neighboring base station information from the serving base station through the RF processor 1310 and the baseband processor 1320. The neighboring base station information includes the information such as the base station identification information and channel information, for searching the neighboring base stations and the priority of the neighboring base stations. The neighboring base station information can be unicast or broadcast to the mobile station. The neighboring base station information can be received after the handover is determined, or on a periodic basis. For the handover, the controller 1340 selects the neighboring base station to search according to the priority of the neighboring base station information. When sequentially searching the neighboring base stations according to the priority and discovering the neighboring base station satisfying the handover condition, the controller 1340 performs the handover.

The controller 1340 receives the beam direction information for presetting the beam through the RF processor 1310 and the baseband processor 1320. Before searching the neighboring base station, the controller 1340 determines the transmit beam for beamforming the signal to transmit to the neighboring base station based on the beam direction information. The controller 1340 controls the RF processor 1310 to beamform the signal with the transmit beam. As such, the priority of the neighboring cells is determined in the wireless communication system and thus the time required by the mobile station to determine the target node for the handover is reduced.

The methods according to embodiments of the present invention may be in a form of program instructions executed through various computer means to be recorded in a computer readable medium. The computer-readable medium may include a program command, a data file, and a data structure individually or a combination thereof. The program instructions recorded in the medium may be specially designed and configured for the present invention, or may be known to and usable by those skilled in the field of computer software.

While the invention has been shown and described with reference to certain embodiments thereof, it will be understood by those skilled in the art that various changes in form and details may be made therein without departing from the spirit and scope of the invention as defined by the appended claims and their equivalents.

What is claimed is:

1. A method for operating a base station in a wireless communication system, the method comprising:
   receiving, from a mobile station, a signal comprising a first component received first and remaining components; and
   transmitting, to the mobile station, information comprising a priority of a first neighboring base station determined based on a difference between a strength of the first component of the signal and a strength of a strongest component of the remaining components of the signal,
wherein the first neighboring base station is located within a threshold range with respect to a direction of a beam allocated to the mobile station.

2. The method of claim 1, wherein,
if the difference between the strength of the first component of the signal and the strength of a strongest component of the remaining components of the signal exceeds a threshold, the priority of the first neighboring base station is higher than a priority of a second neighboring base station located outside the threshold range.

3. The method of claim 2, wherein,
if the difference between the strength of the first component of the signal and the strength of a strongest component of the remaining components of the signal does not exceed the threshold, the priority of the first neighboring base station is lower than the priority of the second neighboring base station.

4. The method of claim 1, further comprising:
determining the difference between the strength of the first component of the signal and the strength of the strongest component of the remaining components of the signal by measuring a channel impulse response (CIR) of a channel between the base station and the mobile station based on the signal;
determining whether a line of sight (LOS) path is secured for the channel according to the difference; and
if the LOS path is secured, determining the priority of the first neighboring base station as being higher than a priority of a second neighboring base station located outside the region.

5. A method for operating a mobile station in a wireless communication system, comprising:
transmitting, to a base station, a signal comprising a first component received first and remaining components;
receiving, from the base station, information comprising a priority of a first neighboring base station located within a threshold range with respect to a direction of a beam allocated to the mobile station;
identifying a target base station among a plurality of neighboring base stations comprising the first neighboring base station based on the priority of the first neighboring base station; and
performing a handover from the base station to the target base station,
wherein the priority of the first neighboring base station is determined by the base station, based on a difference between a strength of the first component of the signal and a strength of a strongest component of the remaining components of the signal.

6. An apparatus of a base station in a wireless communication system, the apparatus comprising:
at least one processor;
at least one transceiver operatively coupled to the at least one processor,
wherein the at least one transceiver is configured to:
receive, from a mobile station, a signal comprising a first component received first and remaining components;
transmit information comprising a priority of a first neighboring base station determined based on a difference between a strength of the first component of the signal and a strength of a strongest component of the remaining components of the signal, and
wherein the first neighboring base station is located within a threshold range with respect to a direction of a beam allocated to the mobile station.

7. The apparatus of claim 6, wherein,
if the difference between the strength of the first component of the signal and the strength of the strongest component of the remaining components of the signal exceeds a threshold, the priority of the first neighboring base station is higher than a priority of a second neighboring base station located outside the threshold range.

8. The apparatus of claim 7, wherein, if the difference between the strength of the first component of the signal and the strength of the strongest component of the remaining components of the signal does not exceed the threshold,
the priority of the first neighboring base station is lower than the priority of the second neighboring base station.

9. The apparatus of claim 6, wherein the at least one processor is further configured to:
determine the difference between the strength of the first component of the signal and the strength of the strongest component of the remaining components of the signal by measuring a channel impulse response (CIR) of a channel between the base station and the mobile station based on the signal;
determine whether a line of sight (LOS) path is secured for the channel according to the difference between the strength of the first component of the signal and the strength of the strongest component of the remaining components of the signal; and
if the LOS path is secured, determine the priority of the first neighboring base station as being higher than a priority of a second neighboring base station located outside the region.

10. An apparatus of a mobile station in a wireless communication system, the apparatus comprising:
at least one processor;
at least one transceiver operatively coupled to the at least one processor,
wherein the at least one transceiver is configured to:
transmit, to a base station, a signal comprising a first component received first and remaining components, and
receive, from the base station, information comprising a priority of a first neighboring base station located within a threshold range with respect to a direction of a beam allocated to the mobile station; and
wherein the at least one processor is configured to:
identify a target base station among a plurality of neighboring base stations comprising the first neighboring base station based on the priority of the first neighboring base station, and
perform a handover from the base station to the target base station,
wherein the priority of the first neighboring base station is determined by the base station based on a difference between a strength of the first component of the signal and a strength of a strongest component of the remaining components of the signal.

11. The method of claim 1, wherein the mobile station performs a handover from the base station to a target base station, and
wherein the target base station is identified among a plurality of neighboring base stations based on the priority of the first neighboring base station.

12. The method of claim 1, wherein the information comprises neighboring base station information regarding a plurality of neighboring base stations including the first neighboring base station.

13. The method of claim 5, wherein identifying the target base station comprises:
identifying the target base station of which priority is highest among a plurality of priorities corresponding to the plurality of neighboring base stations, and
wherein the plurality of priorities includes the priority of the first neighboring base station.

14. The method of claim 5, wherein, if the difference between the strength of the first component of the signal and the strength of a strongest component of the remaining components of the signal exceeds a threshold, the priority of the first neighboring base station is higher than a priority of a second neighboring base station located outside the threshold range.

15. The method of claim 14, wherein, if the difference between the strength of the first component of the signal and the strength of a strongest component of the remaining components of the signal does not exceed the threshold, the priority of the first neighboring base station is lower than the priority of the second neighboring base station.

16. The apparatus of claim 6, wherein the mobile station performs a handover from the base station to a target base station, and
wherein the target base station is identified among a plurality of neighboring base stations based on the priority of the first neighboring base station.

17. The apparatus of claim 6, wherein the information comprises neighboring base station information regarding a plurality of neighboring base stations including the first neighboring base station.

18. The apparatus of claim 10, wherein the at least one processor, in order to identify the target base station, is further configured to:
identify the target base station of which priority is highest among a plurality of priorities corresponding to the plurality of neighboring base stations, and
wherein the plurality of priorities includes the priority of the first neighboring base station.

19. The apparatus of claim 10, wherein, if the difference between the strength of the first component of the signal and the strength of a strongest component of the remaining components of the signal exceeds a threshold, the priority of the first neighboring base station is higher than a priority of a second neighboring base station located outside the threshold range.

20. The apparatus of claim 19, wherein, if the difference between the strength of the first component of the signal and the strength of a strongest component of the remaining components of the signal does not exceed the threshold, the priority of the first neighboring base station is lower than the priority of the second neighboring base station.

* * * * *